US008787191B2

(12) United States Patent
Chen et al.

(10) Patent No.: US 8,787,191 B2
(45) Date of Patent: Jul. 22, 2014

(54) METHOD AND APPARATUS FOR DETERMINING DISTANCE IN A WI-FI NETWORK (75) Inventors: Qifan Chen, Shanghai (CN); Kai Shi, Sunnyvale, CA (US); Ning Zhang, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 13/297,202

(22) Filed: Nov. 15, 2011

(65) Prior Publication Data

US 2013/0121173 A1 May 16, 2013

(51) Int. Cl.
H04L 12/26 (2006.01)
G01S 7/40 (2006.01)
G01S 13/76 (2006.01)
H04J 3/06 (2006.01)

(52) U.S. Cl.
CPC .......... *G01S 7/40* (2013.01); *H04J 3/0667* (2013.01); *G01S 13/765* (2013.01)
USPC .......................................................... 370/252

(58) Field of Classification Search
None
See application file for complete search history.

(56) References Cited

U.S. PATENT DOCUMENTS

| 8,233,457 | B1 | 7/2012 | Chen et al. |
| 2007/0121523 | A1* | 5/2007 | Morandin ..................... 370/252 |
| 2008/0291883 | A1 | 11/2008 | Seok |
| 2009/0011713 | A1 | 1/2009 | Abusubaih et al. |
| 2009/0276674 | A1* | 11/2009 | Wei et al. ..................... 714/749 |
| 2010/0135178 | A1 | 6/2010 | Aggarwal et al. |
| 2010/0150117 | A1 | 6/2010 | Aweya et al. |
| 2011/0269478 | A1 | 11/2011 | Das et al. |
| 2012/0269080 | A1* | 10/2012 | Giustiniano et al. .......... 370/252 |

FOREIGN PATENT DOCUMENTS

EP 2333575 A2 6/2011

OTHER PUBLICATIONS

International Search Report and Written Opinion—PCT/US2012/064524—ISA/EPO—Jan. 24, 2013.

* cited by examiner

*Primary Examiner* — Minh-Trang Nguyen
(74) *Attorney, Agent, or Firm* — Mahamedi Paradice LLP (57) ABSTRACT A method and apparatus for improving the accuracy of a round trip time (RTT) estimate between a first device and a second device are disclosed. The method involves calculating an acknowledgement correction factor and a unicast correction factor. These correction factors are used to compensate for symbol boundary time errors resulting from multipath effects.

19 Claims, 7 Drawing Sheets

METHOD AND APPARATUS FOR DETERMINING DISTANCE IN A WI-FI NETWORK

TECHNICAL FIELD

The present embodiments relate to determining distance in a communication network such as Wi-Fi Network.

BACKGROUND OF RELATED ART

In Wi-Fi communication networks, there are many known techniques for estimating the distance between a mobile device and a wireless access point. For example, the mobile device (e.g., a cell phone or tablet computer) can use the received signal strength indicator (RSSI) corresponding to the access point as a rough approximation of the distance between the mobile device and the access point, where a stronger RSSI means that the mobile device is closer to the access point and a weaker RSSI means that the mobile device is further from the access point. The mobile device can also use the round trip time (RTT) of signals transmitted to and from the access point to calculate the distance between the mobile device and the access point, where the RTT value indicates the total signal propagation time of a unicast signal sent from the mobile device to the access point and a corresponding acknowledgement signal sent from the access point back to the mobile device.

When performing distance measurements using Wi-Fi networks, issues such as hidden nodes, imbalanced interference, and/or differences in response times between various make-and-models of mobile devices can adversely affect accuracy. For example, hidden nodes in Wi-Fi networks, which can cause interference that degrades distance measurement accuracy, occurs when a node is visible from a wireless access point (AP), but not visible from other nodes communicating with the AP. Further, imbalanced interference and/or multi-path effects associated with the physical surroundings of the devices (e.g., physical obstructions between and/or near the devices) can cause different components of the unicast and/or acknowledgment signals to undesirably arrive at respective devices at different times, which in turn further reduces the accuracy of distance measurements using RTT techniques.

Thus, it is desirable to improve the accuracy of distance measurements in Wi-Fi networks.

BRIEF DESCRIPTION OF THE DRAWINGS

The present embodiments are illustrated by way of example and are not intended to be limited by the figures of the accompanying drawings, where.

Like reference numerals refer to corresponding parts throughout the drawing figures.

DETAILED DESCRIPTION

A method and apparatus are disclosed for improving the accuracy of distance measurements between two wireless (e.g., mobile) communication devices. In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. As used herein, the terms packets and signals may be interchangeable because a packet is transmitted from one wireless device to another wireless device via RF signals. Thus, the present embodiments are not to be construed as limited to specific examples described herein but rather to include within their scopes all embodiments defined by the appended claims.

The present embodiments disclose a method and apparatus for improving the accuracy of distance measurements between two (or more) mobile devices by compensating for the effects of unbalanced interference and/or multipath effects associated with the physical surroundings of the devices. For some embodiments, an acknowledgement correction factor (CORR_ACK) and/or a unicast correction factor (CORR_UNC) can be calculated (e.g., in one or more of the devices) to compensate for symbol boundary time errors resulting from a complex multipath environment (e.g., physical obstructions between and/or near the devices) when measuring distances using RTT techniques. The correction factors can be generated using either a one-sided correction technique or a two-sided correction technique. In the one-sided correction technique, only the acknowledgement correction factor is used, and in the two-sided correction technique, both the acknowledgement correction factor and the unicast correction factor are used. Although the two-sided correction technique is typically more accurate than the one-sided correction technique, the two-sided correction technique may require both devices to employ symbol boundary timing techniques, while the one-sided correction technique may require only one of the device to employ symbol boundary timing techniques.

More specifically, in the one-sided correction technique, the acknowledgement correction factor (CORR_ACK) can be calculated in the first device, and the measured RTT value can be adjusted using CORR_ACK. Calculation of the correction factor CORR_ACK can be based on a variety of factors including, for example, the percent of successful unicast packets, the RSSI values of the device(s), the device's modulation coding schedule (MCS), and/or cyclic shift diversity (CSD) values. In the two-sided correction technique, the acknowledgement correction factor (CORR_ACK) can be calculated in the first device, the unicast correction factor (CORR_UNC) can be calculated in the second device, and the measured RTT value can be adjusted using CORR_ACK and CORR_UNC. For the two-sided technique, the CORR_UNC factor can be transmitted from the second device to the first device so that the first device can adjust the measured RTT value using both CORR_ACK and CORR_UNC.

A unicast signal or packet may be defined as a communication sent from a first device to a second device (e.g., as opposed to being sent to multiple other devices). When a unicast packet is sent from a first device A to a second device B, the second device B typically sends an acknowledgment packet back to device A. The propagation times of the unicast signal and the acknowledgement signal can be used to calculate the distance between device A and device B.

Figure 1:
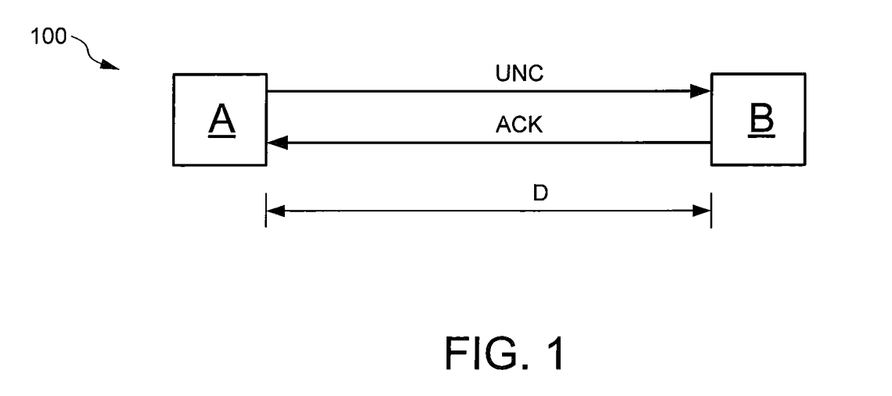
FIG. 1 shows a Wi-Fi system including a first mobile device A and a second mobile device B separated by a distance D.

For example, FIG. 1 shows a system 100 having first device A and second device B separated by a distance D, and depicts a unicast signal (UNC) transmitted from device A to device B and a corresponding acknowledgment signal (ACK) transmitted from device B back to device A. The propagation times of the unicast and acknowledgment signals can be used to calculate the distance D between wireless devices A and B. For some embodiments, devices A and B are mobile communication devices (e.g., cell phone, laptops, and/or tablet computers) that can communication with each other and/or with wireless access points using Wi-Fi communication protocols defined by the IEEE 802.11 family of standards.

More specifically, the round trip time (RTT) between devices A and B represents the total time elapsed from the time that device A sends the unicast packet to device B to the time that device A receives the acknowledgement packet from device B. The time at which device A transmits the unicast packet is referred to herein as the time of departure (TOD), and the time at which device A receives the acknowledgement packet from device B is referred to herein as the time of arrival (TOA). For some exemplary embodiments described herein, the TOD can be a time stamp of when the unicast packet departs device A, and the TOA can be a time stamp of when the acknowledgement packet is received by device A. Accordingly, the difference between the TOA and the TOD can be used as an approximate of the RTT associated with the propagation of the unicast and acknowledgment signals exchanged between device A and device B, where RTT=TOA-TOD.

However, the RTT includes not only the actual signal propagation time periods of the unicast and acknowledgment signals, but also processing delays associated with device B responding to the unicast signal transmitted by device A. More specifically, the RTT can be expressed as:

$$RTT = t_{pn} + t_{del} = TOA - TOD \quad (1)$$

where $t_{pn}$ represents the summation of the travel time of the unicast signal transmitted from device A to device B and the travel time of the acknowledgement signal from device B to device A, and $t_{del}$ is the delay associated with device B receiving the unicast packet from device A and, in response thereto, transmitting the acknowledgment packet back to device A.

Thus, the distance D between device A and device B in FIG. 1 can be expressed as:

$$D = c \cdot t_{pn}/2 = c \cdot (RTT - t_{del})/2 \quad (2)$$

where c is the speed of light.

For some embodiments, $t_{del}$ can include the Short InterFrame Space (SIFS) time interval associated with device B, as defined by the 802.11 standard, and/or can include the Reduced InterFrame Space (RIFS) time interval associated with device B, as defined by the 802.11n standard. The values for $t_{del}$ typically vary between different wireless devices (even those manufactured by the same company) because different devices having various chipsets and/or chipset configurations can have different response times associated with transmitting an acknowledgment signal in response to a unicast signal. Not knowing the exact response time of a particular wireless device introduces inaccuracies in the measured RTT. Indeed, because of the relatively short broadcast range of Wi-Fi transmissions (e.g., typically less than 30 meters) in relation to the propagation speed of the Wi-Fi signals, inaccuracies in the measured RTT resulting from unknown variations in the devices' response times can lead to large errors in the distance calculations.

For some embodiments, various RTT characteristics (e.g., the delay time ($t_{del}$) associated with processing connection requests and its boot-up time) of various make-and-models of wireless devices can be retrieved from an RTT characteristics database accessible by the devices, for example, as described in co-pending and commonly-owned U.S. patent application Ser. No. 13/109,481 entitled "Wi-Fi ACCESS POINT CHARACTERISTICS DATABASE," the entirety of which is incorporated by reference herein. For one such embodiment, the RTT characteristics of a particular device can be retrieved from the database by providing the MAC address of the device as a look-up value to the database. For example, device A can determine the MAC address of device B as follows. First, device A transmits a probe request to device B to retrieve its identification information. For example, device A may broadcast probe requests on several different channels until it finds the channel on which device B is configured to operate. Alternatively, both the devices A and B may be pre-configured to operate on the same channel for ranging purposes. Then, device B responds to the probe request by transmitting a probe response back to device A. The probe response includes identification information (e.g., a MAC address) associated with the second device B.

Figure 2:
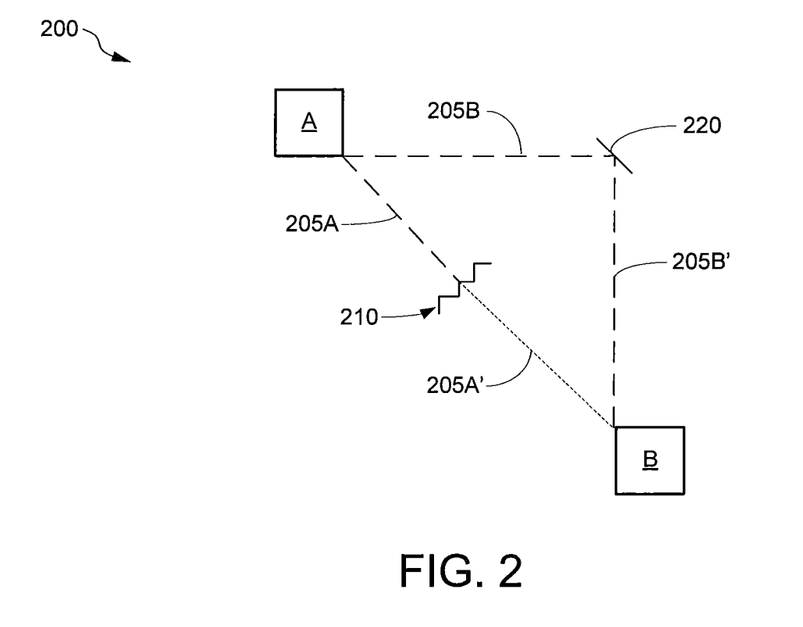
FIG. 2 illustrates the effects of imbalanced interference in a multi-path environment.

The RTT value can also be affected by imbalanced interference or multipath effects that causes different components of the unicast signal to arrive at device B at different times and/or that causes different components of the acknowledgement signal to arrive at device A at different times. For example, FIG. 2 illustrates a system 200 having first device A and second device B with imbalanced interference in a multipath environment. Device A transmits a signal (e.g., a unicast signal) to device B. A first component 205A of the transmitted signal travels directly towards second device B through an interference source (e.g., an object or other obstacle) 210 positioned between device A and device B. The interference source may attenuate signal component 205A, and the resulting attenuated signal component 205A' is received by second device B. Thus, for the present example, the attenuated signal component 205A' has a lower magnitude than the original signal component 205A.

A second component 205B of the transmitted signal is transmitted indirectly towards second device B via a reflector 220, which results in a reflected signal component 205B' being received by second device B. If the reflector 220 has a high quality factor, then the reflected signal component 205B' can have a magnitude that is approximately equal to the magnitude of original signal component 205A. Thus, first attenuated signal component 205A' arrives at second device B before the second reflected signal component 205B', and first attenuated signal component 205A' may have a magnitude that is less that the magnitude of second reflected signal component 205B'.

Figure 3A:
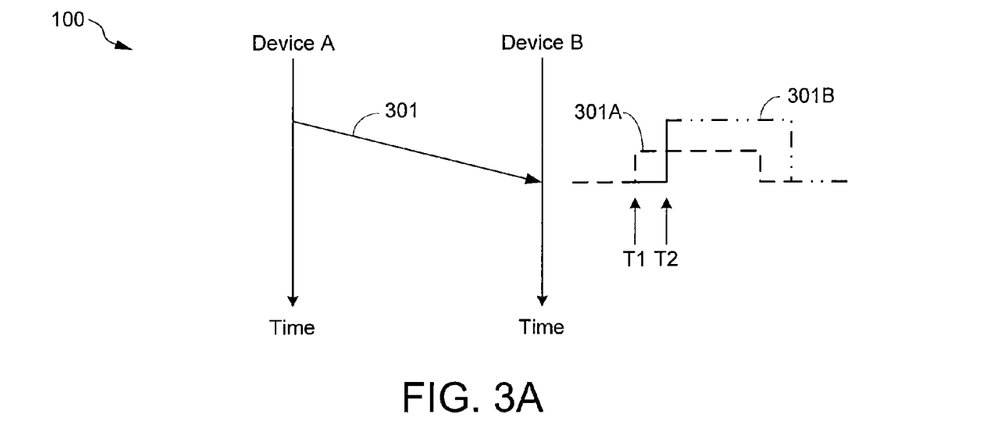
FIG. 3A shows the transmission of a unicast packet from device A to device B, and depicts different components of the unicast packet arriving at device B at different times.
Figure 3B:
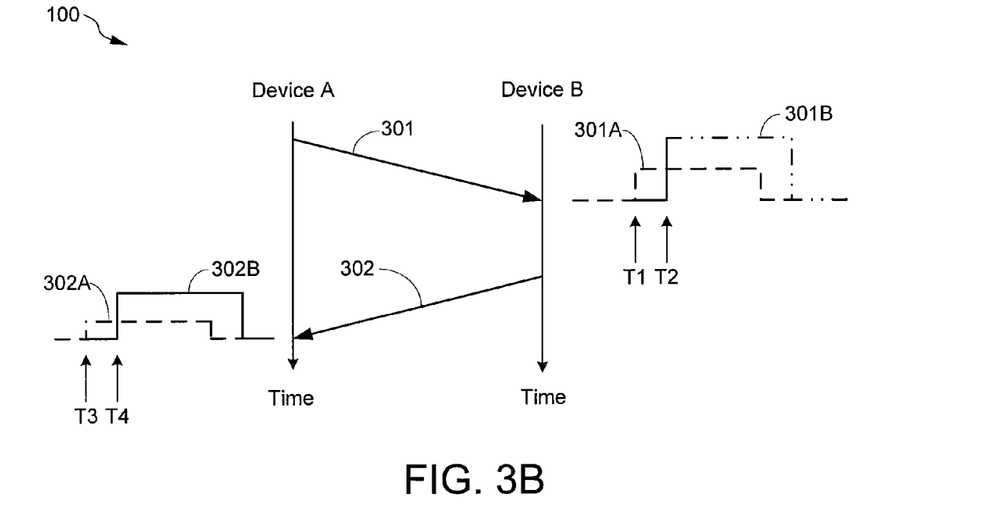
FIG. 3B further shows the transmission of an acknowledgement packet from device B to device A, and depicts different components of the acknowledgement packet arriving at device A at different times.

FIGS. 3A and 3B depict the effects of unbalanced interference (e.g., as described above with respect to FIG. 2) when calculating the distance between devices A and B of system 100. In FIG. 3A, device A is depicted transmitting a unicast signal 301 to device B. Due to the effects of a multi-path environment, different components of signal 301 arrive at device B at different times. For example, a first signal component 301A arrives at device B at time T1, while a second signal component 301B arrives at device B at time T2. Thus, the first and second signal components 301A and 301B of the unicast signal can be used to calculate the unicast correction factor as CORR_UNC=T2−T1 using circuitry (not shown for simplicity) within device B. Note that for purposes of discussed herein, FIG. 3A depicts first signal component 301A as having a smaller magnitude than second signal component 301B.

FIG. 3B further depicts device B transmitting an acknowledgment signal 302 back to device A. Due to the effects of the multi-path environment, different components of signal 302 arrive at device A at different times. For example, a first signal component 302A arrives at device A at time T3, while a second signal component 302B arrives at device A at time T4. Thus, the first and second signal components 302A and 302B of the acknowledgement signal can be used to calculate the acknowledgement correction factor as CORR_ACK=T4−T3 using circuitry (not shown for simplicity) within device A. Note that for purposes of discussed herein, FIG. 3B depicts first signal component 302A as having a smaller magnitude than second signal component 302B.

Thus, in accordance with some embodiments, components of signal 301 can be used to determine the unicast correction factor (CORR_UNC) in second device B, and components of signal 302 can be used to determine the acknowledgment correction factor (CORR_ACK) in first device A. Thereafter, in a one-sided correction technique, CORR_ACK can be used to more accurately calculate the RTT between device A and device B, and in a two-sided correction technique, both CORR_ACK and CORR_UNC can be used to more accurately calculate the RTT between device A and device B. For the two-sided correction technique, the value of CORR_UNC can be transmitted from device B to device A (e.g., by embedding the value of CORR_UNC in the acknowledgment signal 302). In this manner, device A can have values for both CORR_UNC and CORR_ACK to perform the two-sided correction technique.

As mentioned above, unicast and acknowledgment correction factors (CORR_UNC and CORR_ACK) can be used to compensate for unbalanced interference and/or multi-path effects. More specifically, RTT can now be expressed as:

$$RTT=TOA-TOD-CORR\_UNC-CORR\_ACK-K \quad (2)$$

where K is a constant that can embody the processing delays $t_{del}$.

Figure 4:
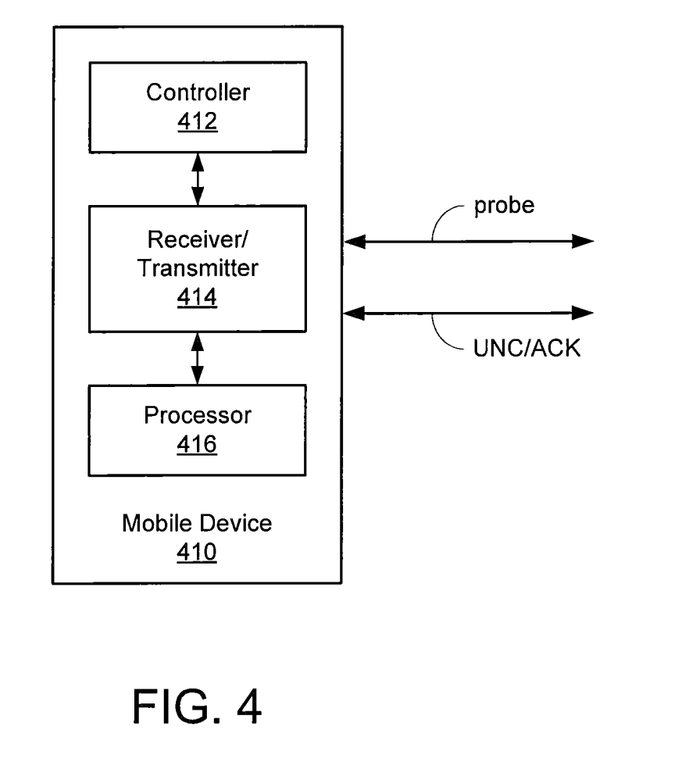
FIG. 4 shows a functional block diagram of one embodiment of the mobile devices of FIG. 1.

FIG. 4 shows a functional block diagram of a mobile communication device 410 that is one embodiment of mobile devices A and B of FIG. 1. The mobile device 410 includes a controller 412, a receiver/transmitter 414, and a processor 416. The receiver/transmitter 414 includes circuitry for transmitting and receiving wireless data signals according to Wi-Fi or other known wireless protocols. The controller 412 enables the mobile device 410 to perform distance measurements, for example, by configuring the receiver/transmitter 414 to broadcast probe requests (e.g., on one or more wireless channels) and listen for probe responses to detect the presence of another mobile device within range of the mobile device 410. The controller 412 can also retrieve identification information from received probe responses, and can configure the receiver/transmitter 414 to transmit a unicast packet to the other device.

The processor 416 can determine the distance between mobile device 410 and the other mobile device (not shown for simplicity) using RTT techniques discussed above. For example, when the receiver/transmitter 414 transmits a unicast packet to the other mobile device, the processor 416 can detect and store the time instant (e.g., TOD) at which the unicast packet is transmitted from the mobile device 410. Similarly, when the receiver/transmitter 414 receives an acknowledgment packet from the other mobile device, the processor 416 can also detect and store the time instant (e.g., TOA) at which the acknowledgment packet is received at mobile device 410. The processor 416 can then calculate the RTT value based on the TOA, TOD, and the correction factors, as described above with respect to Equation 2, and thereafter determine the distance D to the other mobile device.

Referring again to FIG. 1, if both device A and device B support symbol boundary timing, then the two-sided correction technique can be used to calculate the value of RTT using equation (2). Conversely, if device B does not support symbol boundary timing, then the one-sided correction technique can be used, where the value of CORR_ACK is substituted for CORR_UNC, as expressed below:

$$RTT=TOA-TOD-2\times(CORR\_ACK)-K \quad (3)$$

If the uplink and downlink channels between devices A and B are symmetric, then the values of CORR_ACK and CORR_UNC may be approximately equal to each other. There can be several reasons that cause the uplink and downlink channels to lack symmetry including, for example, imbalance interference, different CSD values, and a different number of antennas on devices A and B. For purposes of this disclosure, the term "approximately" means that there is minimal ranging error. For example, when the ranging error is less than 3 m, then the difference between CORR_ACK and CORR_UNC is less than 20 ns.

If the uplink and downlink channels between devices A and B are not symmetric, for example, where device A is a 1T1R (one transmitter and one receiver) device and the second device B is a 2T2R (two transmitters and two receivers) device, then embodiments of the present disclosure can compensate for channel asymmetry as follows. First, device A sends a public action frame to inform device B to begin distance measurements. The public action frame can include a predetermined code indicating the configuration of the transmit/receive (Tx/Rx) circuitry and antenna(s) of device A, as known in the art. For some embodiments, the public action frame can be a special unicast management frame that does not include regular data. In response thereto, device B can enter a calibration mode, and can configure its Tx/Rx circuitry and antenna(s) in response to the configuration information received from device A. Next, device A sends the unicast packet to device B, and device B responds with an acknowledgment packet so that device A can determine one or more RTT values indicative of the distance between device A and device B. Finally, device A sends another public action frame that causes device B to complete the distance measurement operation, and thereafter device B returns to its normal operating mode. It should be noted that when device B is operating in the calibration mode, it may not be able to support normal Wi-Fi operations (e.g., operations other than distance measurements).

As mentioned above, calculation of the correction factors CORR_ACK and CORR_UNC can be based upon a variety of factors including, for example, the percent of successful unicast packets, the RSSI values of the devices, each device's configuration (e.g., the number of antennas, transmitters, and receivers in the device), each device's modulation coding schedule (MCS), and/or each device's cyclic shift diversity (CSD) values.

For example, for some embodiments, if the RSSI of devices A and B are detectable and are sufficiently high to enable distance measurement (e.g., if devices A and B are relatively close to each other), and if the percentage of successful unicast packets transmitted from device A to device B is lower than a selected threshold value $T_{UNC}$, then the calculated values for the correction factors CORR_UNC and CORR_ACK can be ignored. For one embodiment, the RSSI values can be used instead of the correction factors to perform distance measurements between the devices if the unicast packet loss rate is less than approximately $10^{-2}$ and/or the RSSI value is greater than a predetermined threshold value. For other embodiments, a specific MCS setting can be estimated based upon the device's RSSI (which can indicate how close the other device is), and if the percentage of successful unicast packets transmitted from device A to device B is lower than the selected threshold value $T_{UNC}$, then the calculated values for the correction factors CORR_UNC and CORR_ACK can be ignored. For example, if devices A and B are relatively close to each other (e.g., as may be determined by RSSI information), then the devices may select a different MCS to allow for increased data throughput. The selection of the different (and typically more complicated) MCS for "close-range" applications is usually dependent upon better signal to noise ratios, and therefore are usually applicable only when the RSSI values are relatively high. Correction factors can take into account the specific MCS settings of the devices to increase accuracy of the RTT estimate.

Thus, for some embodiments, if the MCS and packet length change, a selected number of OFDM symbol periods can be set as a correction value (CV) and then either added or subtracted from the measured RTT value. More specifically, if the packet frame length becomes larger as compared with the packet frame length used for calibration, then the resulting correction value is subtracted from the measured RTT value. Conversely, if the frame length becomes smaller as compared with the frame length used for calibration, then the resulting correction value is added to the measured RTT value.

When device A and device B are MIMO devices that employ CSD techniques, then each of their transmit chains will typically have a different CSD value, which in turn can be compensated for by making adjustments to the measured RTT value. Indeed, in a MIMO wireless device, all signals to be transmitted from the device have a different amount of delay applied to each transmitter antenna, wherein one of the signals is not delayed. For one example, in a 2×2 MIMO device, the first transmit chain typically has a CSD value of zero (e.g., indicating no CSD delay value), and the second transmit chain typically has a CSD value of 200 ns (e.g., as specified by the IEEE 802.11 standards). For another example, in a 3×3 MIMO device, the first transmit chain typically has no CSD value (e.g., no delay), the second transmit chain typically has a CSD value of 200 ns, and the third transmit chain typically has a CSD value of 400 ns. In this manner, each of a plurality of signals transmitted from different chains of the same device is incrementally delayed by a specified CSD value to achieve signal diversity. Of course, when receiving multiple signals from a MIMO device, the incremental delays between the signals can undesirably lead to errors in calculating the RTT value between the two devices.

For one embodiment, one device can determine whether a particular CSD value can be assumed for the other device, or whether the CSD value for the other device needs to be determined. For some embodiments, information indicating the other device's Tx/Rx configuration (e.g., the number of transmit chains) can be extracted from the other device's beacon signal, for example, to determine whether the other device supports multiple spatial streams. If the other device supports multiple spatial streams, which can indicate that the other device includes multiple Tx/Rx chains, then the CSD value may be a predetermined value (e.g., a multiple of 200 ns) defined by the 802.11 standards. If the other device employs CSD techniques, then the maximal cyclic shift value can be set as the correction value (CV) and subtracted from the measured RTT value. For example, if device A and device B both include two transmitters and one receiver (e.g., a 2T1R device) with a cyclic shift value of 200 ns, then a correction value of 2*(200 ns)=400 ns can be subtracted from the measured RTT value. Note that the CSD value is multiplied by 2 to account for signal propagation from the first device to the second device and then back to the first device.

Figure 5A:
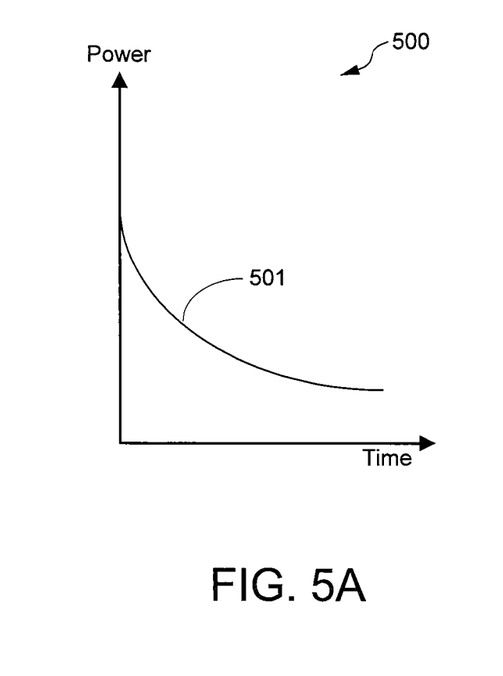
FIG. 5A depicts a power delay profile of a signal transmitted without cyclic shift diversity.
Figure 5B:
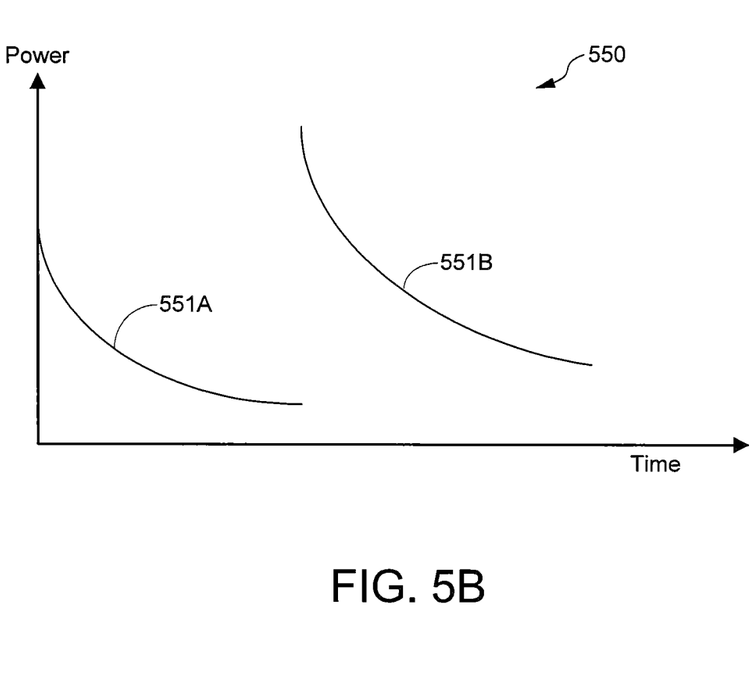
FIG. 5B depicts a power delay profile of a signal transmitted with cyclic shift diversity.
Figure 6:
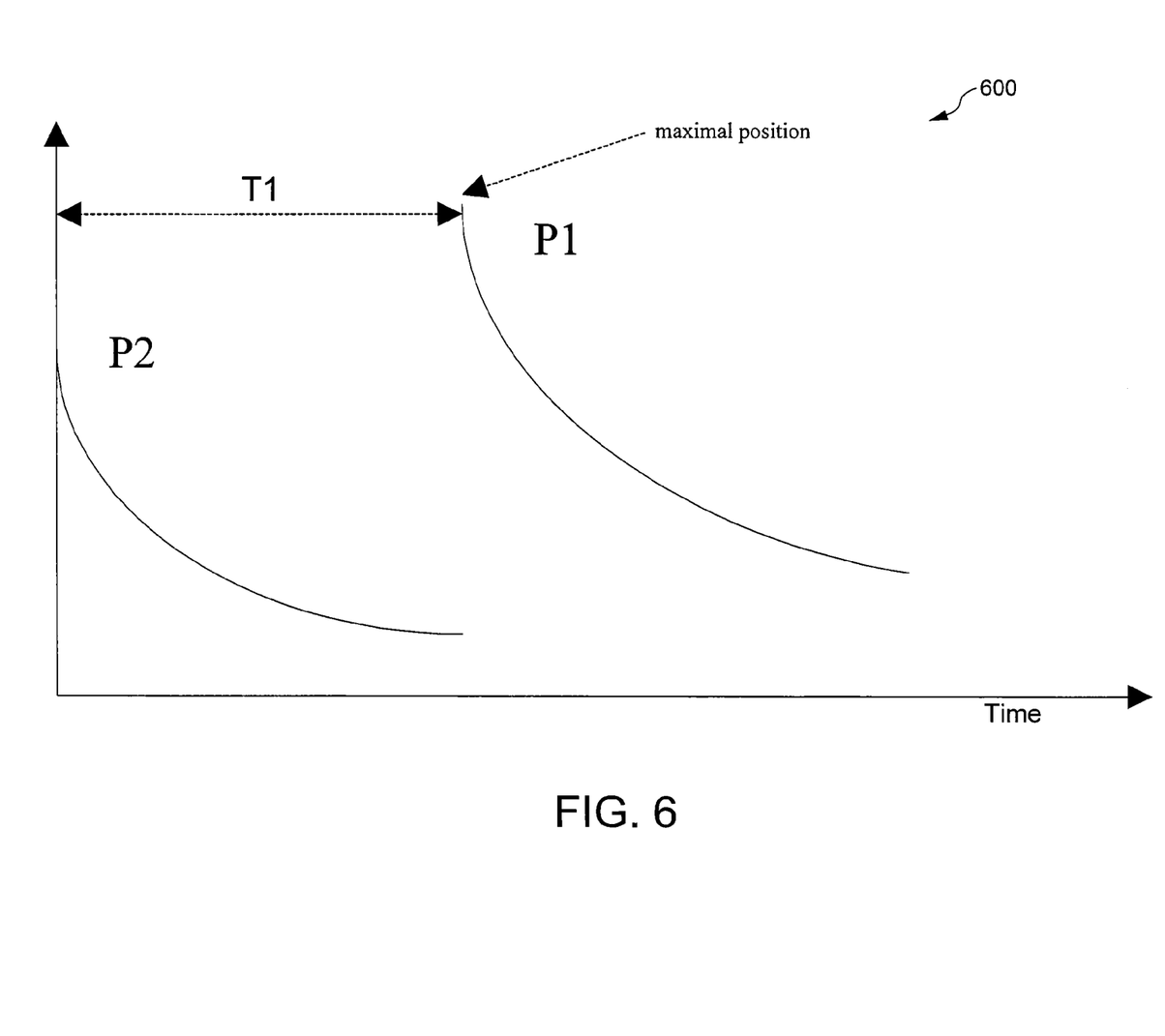
FIG. 6 depicts the maximal value position in a power delay profile with cyclic shift diversity.

For another embodiment, the shape of a power delay profile can be used to determine whether the CSD value of a particular device can be assumed. In general, the power delay profile (PDP) gives the intensity of a signal received through a multipath channel as a function of time delay. The time delay is the difference in travel time between multipath arrivals. For example, FIG. 5A is a graph 500 depicting a signal 501 having an exponential decay for applications in which packets associated with the signal 501 do not include cyclic shift diversity, and FIG. 5B is a graph 550 depicting a power delay profile of a signal 551 having components 551A and 551B having an exponential decay for applications in which packets associated with signal 551 include cyclic shift diversity. For example, when the mobile device includes two transmitter chains and employs CSD, the power delay profile typically includes two components, as depicted in FIG. 5B and FIG. 6, where the difference between the components can be in both magnitude and time delay. Note that when packets do not include cyclic shift diversity, the power delay profile typically monotonically decreases. In contrast, when packets include cyclic shift diversity, the power delay profiles may not monotonically decrease. Thus, in accordance with present embodiments, if the shape of power delay profile monotonically decreases, then it can be assumed that the corresponding device includes one or more CSD values.

In another approach, the CSD value of one device (e.g., device B) can be assigned to the other device (e.g., device A). For this approach, if device A includes only one transmitter chain and device B includes multiple transmitter chains, the CSD values may be ignored.

In another approach, the CSD values of a wireless device can be derived using a derivation operation described below with respect to a graph 600 of FIG. 6. First, the maximal value position of the device is determined, and its associated power level (P1) is recorded. Next, a time period T1 corresponding to the CSD value is shifted from the maximal value position, and its power level (P2) is recorded. For an exemplary embodiment, the time period T1 is equal to approximately 200 ns (e.g., as defined in the 802.11 standards). The power levels P1 and P2 are then compared to generate a power difference value $P_{diff}=P2-P1$. If the power difference value $P_{diff}$ is greater than a predetermined power level $T_{power}$ (e.g., if $P_{diff} > T_{power}$), then the CSD values are ignored. Thus, if CSD does not exist, P2 will be the noise power with a high probability, and thus $P_{diff}$ should have a relatively large value.

In another approach, the CSD values can be derived by detecting whether the devices have different numbers of antennas. If so, then software within one of the devices (e.g., the second device) can be updated to allow for detection of the CSD value.

In another approach, the CSD values of each device can be determined and transmitted to the other device.

Figure 7:
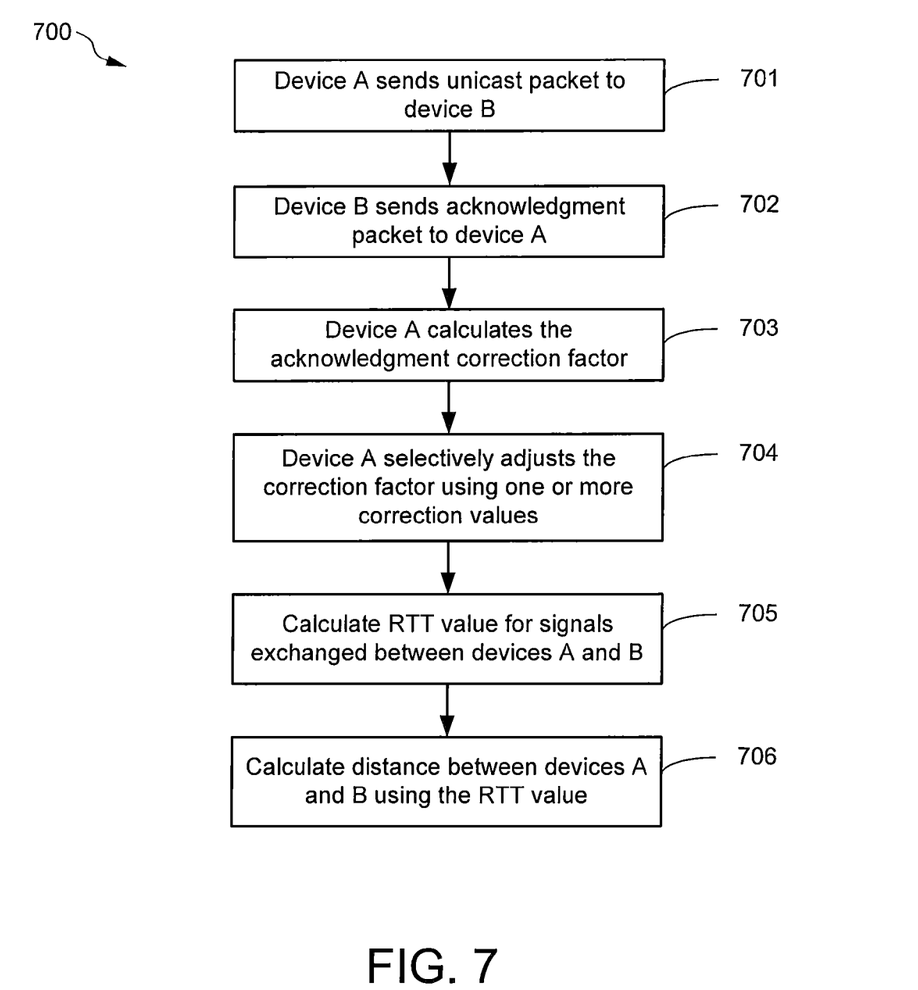
FIG. 7 is a flowchart depicting an exemplary operation for improving the accuracy of distance measurements between two mobile devices in accordance with some embodiments.

FIG. 7 is an illustrative flowchart 700 depicting an exemplary one-sided correction technique, in accordance with the present embodiments, to improve the accuracy of distance measurements between first device A and second device B using RTT techniques. First, device A sends a unicast packet to device B (701). In response thereto, device B sends an acknowledgement packet back to device A (702). Then, device A calculates an acknowledgement correction factor (703). As described above, the acknowledgment correction factor can be used to compensate for the effects of multi-path upon the acknowledgment signal sent from device B to device A. Next, device A can selectively adjust the calculated correction factor using one or more correction values (704). As described above, these correction values can compensate for different CSD values of the devices, for changes in packet length and MCS settings, and so on. Then, device A calculates the RTT of the unicast and acknowledgement signals exchanged between devices A and B (705). For some embodiments, device A can calculate RTT using equation (3) above. Finally, device A uses the RTT value to determine the distance between devices A and B (706). Note that steps 702-706 can be performed by processor 416 of device A (see also FIG. 4).

Figure 8:
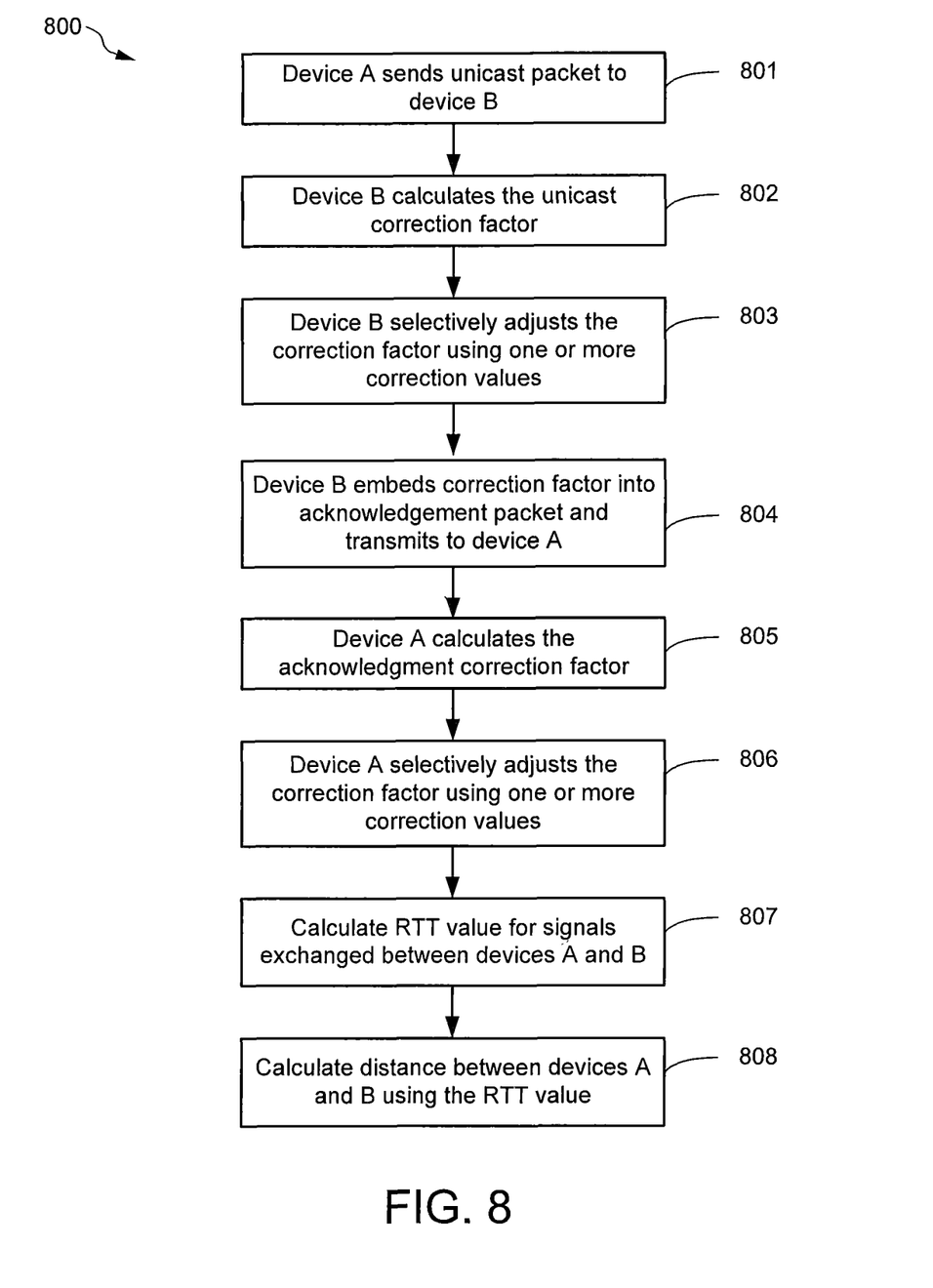
FIG. 8 is a flowchart depicting an exemplary operation for improving the accuracy of distance measurements between two mobile communication devices in accordance with other embodiments.

FIG. 8 is an illustrative flowchart 800 depicting an exemplary two-sided correction technique, in accordance with the present embodiments, to improve the accuracy of distance measurements between first device A and second device B using RTT techniques. First, device A sends a unicast packet to device B (801). In response thereto, device B calculates a unicast correction factor (802). As described above, the unicast correction factor can be used to compensate for the effects of multi-path upon unicast signals transmitted from device A to device B. Next, device B can selectively adjust the calculated correction factor using one or more correction values (803). As described above, these correction values can compensate for different CSD values of the devices, for changes in packet length and MCS settings, and so on. Next, device B embeds the unicast correction factor into an acknowledgement packet, and transmits the acknowledgement packet back to device A (804). Then, device A calculates an acknowledgement correction factor (805). As described above, the acknowledgment correction factor can be used to compensate for the effects of multi-path upon the acknowledgment signals sent from device B to device A. Next, device A can selectively adjust the calculated correction factor using one or more correction values (806). As described above, these correction values can compensate for different CSD values of the devices, for changes in packet length and MCS settings, and so on. Then, device A calculates the RTT of the unicast and acknowledgement signals exchanged between devices A and B (807). For some embodiments, device A can calculate RTT using equation (2) above. Finally, device A uses the RTT value to determine the distance between devices A and B (808). Note that steps 802-804 can be performed by processor 416 of device B, and steps 805-808 can be performed by processor 416 of device A (see FIG. 4).

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method for improving accuracy of a round trip time (RTT) estimate between a first device and a second device, the method comprising:
   transmitting a unicast packet from the first device to the second device;
   determining a unicast correction factor (CORR_UNC) using a processor in the second device, wherein the unicast correction factor is to compensate for multipath effects upon the unicast packet;
   embedding the unicast correction factor in an acknowledgment packet in the second device;
   transmitting the acknowledgment packet from the second device to the first device;
   determining an acknowledgment correction factor (CORR_ACK) using a processor in the first device, wherein the acknowledgment correction factor is to compensate for multipath effects upon the acknowledgment packet; and
   calculating the RTT estimate in the first device using the unicast correction factor and the acknowledgment correction factor.

2. The method of claim 1, wherein the RTT estimate is calculated as TOA−TOD−CORR_UNC−CORR_ACK−K, wherein TOA is a time of arrival of the acknowledgment packet at the first device, TOD is a time of departure of the unicast packet from the first device, and a K is a constant that embodies processing delays associated with the processor of the second device.

3. The method of claim 1, further comprising:
   selectively substituting the unicast correction factor for the acknowledgment correction factor if the second device does not support symbol boundary timing.

4. The method of claim 1, wherein determining the acknowledgment correction factor further comprises:
   ignoring the acknowledgment correction factor if a percentage of the unicast packets successfully transmitted to the second device is lower than a predetermined percentage.

5. The method of claim 4, wherein determining the acknowledgment correction factor further comprises:
   ignoring the acknowledgment correction factor only if an RSSI value of either the first device or the second device is greater than a predetermined value.

6. The method of claim 1, wherein determining the acknowledgment correction factor further comprises:
   estimating a specific modulation coding schedule (MCS) based upon an RSSI value of the second device.

7. The method of claim 1, wherein determining the acknowledgment correction factor further comprises:
   determining a cyclic shift diversity (CSD) value for the second device; and
   subtracting a selected multiple of the determined CSD value from the acknowledgment correction factor.

8. The method of claim 1, further comprising maintaining channel symmetry between the first and second devices by:
   sending a first public action frame from the first device to the second device requesting the second device to commence a distance measurement operation;
   entering the second device into a configuration mode in response to the first public action frame;
   determining an antenna configuration for the first device;

configuring an antenna of the second device using the antenna configuration determined for the first device;

sending a special unicast packet from the first device to the second device to collect RTT information;

sending a second public action frame from the first device to the second device requesting the second device to complete the distance measurement operation; and restoring the first device to its original antenna configuration.

9. A system for improving accuracy of a round trip time (RTT) estimate between a first device and a second device, comprising:

means for transmitting a unicast packet from the first device to the second device;

means for determining a unicast correction factor (CORR_UNC) using a processor in the second device, wherein the unicast correction factor is to compensate for multipath effects upon the unicast packet;

means for embedding the unicast correction factor in an acknowledgment packet in the second device;

means for transmitting the acknowledgment packet from the second device to the first device;

means for determining an acknowledgment correction factor (CORR_ACK) using a processor in the first device, wherein the acknowledgment correction factor is to compensate for multipath effects upon the acknowledgment packet; and means for calculating the RTT estimate in the first device using the unicast correction factor and the acknowledgment correction factor.

10. The system of claim 9, wherein the RTT estimate is calculated as TOA−TOD−CORR_UNC−CORR_ACK−K, wherein TOA is a time of arrival of the acknowledgment packet at the first device, TOD is a time of departure of the unicast packet from the first device, and a K is a constant that embodies processing delays associated with the processor of the second device.

11. The system of claim 9, further comprising:

means for selectively substituting the unicast correction factor for the acknowledgment correction factor if the second device does not support symbol boundary timing.

12. The system of claim 9, wherein the means for determining the acknowledgment correction factor further comprises:

means for ignoring the acknowledgment correction factor if a percentage of the unicast packets successfully transmitted to the second device is lower than a predetermined percentage.

13. The system of claim 12, wherein the means for determining the acknowledgment correction factor further comprises:

means for ignoring the acknowledgment correction factor only if an RSSI value of either the first device or the second device is greater than a predetermined value.

14. The system of claim 9, wherein the means for determining the acknowledgment correction factor further comprises:

means for estimating a specific modulation coding schedule (MCS) based upon an RSSI value of the second device.

15. The system of claim 9, wherein the means for determining the acknowledgment correction factor further comprises:

means for determining a cyclic shift diversity (CSD) value for the second device; and means for subtracting a selected multiple of the determined CSD value from the acknowledgment correction factor.

16. A method for improving accuracy of a round trip time (RTT) estimate between a first device and a second device, the method comprising:

receiving a unicast packet from the first device;

receiving an acknowledgment packet from the second device by the first device;

determining an acknowledgment correction factor (CORR_ACK) using a processor in the first device, wherein the acknowledgment correction factor is to compensate for multipath effects upon the acknowledgment packet, and wherein determining the acknowledgment correction factor further comprises:

determining a cyclic shift diversity (CSD) value for the second device; and subtracting a selected multiple of the determined CSD value from the acknowledgment correction factor; and calculating the RTT estimate in the first device using the acknowledgment correction factor.

17. The method of claim 16, wherein the RTT estimate is calculated as TOA−TOD−2×CORR_ACK−K, wherein TOA is a time of arrival of the acknowledgment packet at the first device, TOD is a time of departure of the unicast packet from the first device, and a K is a constant that embodies processing delays associated with a processor of the second device.

18. The method of claim 16, wherein determining the acknowledgment correction factor further comprises:

ignoring the acknowledgment correction factor if a percentage of the unicast packets successfully transmitted to the second device is lower than a predetermined percentage.

19. The method of claim 18, wherein determining the acknowledgment correction factor further comprises:

ignoring the acknowledgment correction factor only if an RSSI value of either the first device or the second device is greater than a predetermined value.

* * * * *